(12) United States Patent
Sekiya

(10) Patent No.: US 10,071,638 B2
(45) Date of Patent: Sep. 11, 2018

(54) ELECTRIC VEHICLE AND EQUIPMENT THEREFOR

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 15/420,330

(22) Filed: Jan. 31, 2017

(65) Prior Publication Data

US 2017/0217321 A1    Aug. 3, 2017

(30) Foreign Application Priority Data

Feb. 1, 2016    (JP) ................................. 2016-016847

(51) Int. Cl.
| | | |
|---|---|---|
| *H01L 31/042* | (2014.01) | |
| *B60L 11/18* | (2006.01) | |
| *H02S 20/30* | (2014.01) | |
| *H02S 30/20* | (2014.01) | |
| *H02S 40/34* | (2014.01) | |
| *H02S 40/38* | (2014.01) | |
| *H02J 7/35* | (2006.01) | |

(52) U.S. Cl.
CPC .......... *B60L 11/1809* (2013.01); *H02J 7/355* (2013.01); *H02S 20/30* (2014.12); *H02S 30/20* (2014.12); *H02S 40/34* (2014.12); *H02S 40/38* (2014.12); *B60Y 2200/91* (2013.01); *B60Y 2300/91* (2013.01); *B60Y 2400/216* (2013.01)

(58) Field of Classification Search
CPC ...... B60L 11/1809; H02J 7/355; H02S 40/38; H02S 30/20; H02S 40/34; H02S 20/30; B62M 6/85; H02P 1/00; H01L 31/042

USPC ........ 318/577, 640; 136/206, 243, 244, 245, 136/200; 242/331.4; 340/583, 630, 942; 356/53, 434; 180/68.5, 207.2; 204/196.27; 257/E25.009
See application file for complete search history.

(56) References Cited

U.S. PATENT DOCUMENTS

| | | | | |
|---|---|---|---|---|
| 5,141,173 | A | * | 8/1992 | Lay ........................... B60F 5/02 180/117 |
| 7,520,355 | B2 | * | 4/2009 | Chaney .................... B60K 1/04 180/68.5 |
| 9,837,570 | B2 | * | 12/2017 | Retti ...................... H01L 31/056 |
| 2007/0125417 | A1 | * | 6/2007 | Johanson ............ H01M 10/465 136/244 |

(Continued)

FOREIGN PATENT DOCUMENTS

| | | |
|---|---|---|
| JP | 04-145806 | 5/1992 |
| JP | 2013-235874 | 11/2013 |

*Primary Examiner* — Antony M Paul
(74) *Attorney, Agent, or Firm* — Greer Burns & Crain Ltd.

(57) ABSTRACT

Disclosed herein is an electric vehicle including a power source, an electric motor adapted to be supplied with electric power from the power source for vehicle driving, a sheet-shaped solar battery for electric power generation, a storing portion for storing the sheet-shaped solar battery in its nonoperating condition, and a connecting unit for allowing the supply of electric power from the sheet-shaped solar battery to at least one of the electric motor and the power source, wherein when the sheet-shaped solar battery is used to perform electric power generation, the sheet-shaped solar battery is taken out of the storing portion and then spread to effect photovoltaic power generation.

6 Claims, 2 Drawing Sheets

(56) References Cited

U.S. PATENT DOCUMENTS

| | | | |
|---|---|---|---|
| 2009/0200869 A1* | 8/2009 | Fein | B60K 16/00 307/69 |
| 2010/0000804 A1* | 1/2010 | Yeh | B60K 16/00 180/2.2 |
| 2010/0252088 A1* | 10/2010 | Fein | B60L 11/1824 136/244 |

* cited by examiner

ELECTRIC VEHICLE AND EQUIPMENT THEREFOR

BACKGROUND OF THE INVENTION

Field of the Invention

The present invention relates to an electric vehicle including an electric motor for driving wheels and a power source for supplying electric power to the electric motor, and also to equipment for the electric vehicle.

Description of the Related Art

In recent years, environmental awareness has grown and attention is focused on an electric vehicle not including an internal combustion engine consuming a fossil fuel such as gasoline and discharging carbon dioxide, but including an electrical drive system for controlling a current to be supplied from a storage battery to an electric motor for driving the vehicle, thereby allowing the vehicle to run (see Japanese Patent No. 2685644, for example). Further, attention is also focused on a so-called hybrid electric vehicle including both the internal combustion engine and the electrical drive system as mentioned above, wherein a generator is driven by the internal combustion engine to generate electric power, which can also be supplied to the electric motor.

Further, development of a fuel cell vehicle has also been promoted. The fuel cell vehicle includes a so-called fuel cell as a power source for generating electric power by an electrochemical reaction of hydrogen and oxygen, wherein the electric power generated by the fuel cell is supplied to an electric motor for driving the vehicle. Further, development of a flexible sheet-shaped solar battery as a solar cell module has also been promoted in recent years, wherein the sheet-shaped solar battery is formed by sealing a power generating element with a flexible film without using a glass plate (see Japanese Patent Laid-open No. 2013-235874, for example). Application of this sheet-shaped solar battery to various technical fields is expected.

The term of "electric vehicle" used herein means not only an electric vehicle including only the electrical drive system as mentioned above, but also any vehicle such as a hybrid electric vehicle and a fuel cell vehicle as mentioned above, including an electric motor for driving the vehicle and a power source for supplying electric power to the electric motor.

SUMMARY OF THE INVENTION

In the electric vehicle, the storage battery as a power source for supplying electric power to the electric motor is reduced in storage capacity in driving the vehicle. In this case, the storage battery must be charged. However, as compared with a gas station for filling gasoline or gas oil as a fuel for an internal combustion engine, a charging station for charging the storage battery mounted in the vehicle is less diffused. Accordingly, there is a possibility that the storage battery cannot be charged by the time the storage capacity has been reduced to reach a lower limit. In particular, in the case that the storage capacity of the storage battery has reached a lower limit in a general electric vehicle including only the electrical drive system, the storage battery must be charged from only a commercial power supply, so as to continue to drive the vehicle. In the case that such a commercial power supply is not available, there is a problem such that the vehicle may be forced to rely on a tow truck or the like.

Further, also in an electric vehicle (fuel cell vehicle) adopting a fuel cell as a power source, there is a case that hydrogen as a fuel for the fuel cell becomes empty. In this case, hydrogen must be supplied to the electric vehicle. However, a hydrogen station for filling hydrogen as a fuel for the fuel cell is less diffused as compared with a charging station for charging a storage battery. Accordingly, in the case that the fuel (hydrogen) becomes empty, it is difficult to drive the electric vehicle including the fuel cell. Also in a hybrid electric vehicle, there is a case that both the fuel for the internal combustion engine and the storage capacity of the storage battery becomes empty. In this case, the vehicle cannot be driven. Accordingly, in the case that the fuel cannot be filled and the storage battery cannot be charged, there is no means for driving the vehicle and it is desirable to cope with this problem.

It is therefore an object of the present invention to provide an electric vehicle which can be driven even when electric power cannot be supplied from the power source to the electric motor, and also equipment for the electric vehicle.

In accordance with an aspect of the present invention, there is provided an electric vehicle including a power source; an electric motor adapted to be supplied with electric power from the power source for vehicle driving; a sheet-shaped solar battery for electric power generation; a storing portion for storing the sheet-shaped solar battery in its nonoperating condition; and connecting means for allowing the supply of electric power from the sheet-shaped solar battery to at least one of the electric motor and the power source; wherein when the sheet-shaped solar battery is used to perform electric power generation, the sheet-shaped solar battery is taken out of the storing portion and then spread to effect photovoltaic power generation.

Preferably, the sheet-shaped solar battery is stored in a rolled condition in the storing portion. Further, the position of the storing portion is set so that the electric vehicle can be driven in the condition where the sheet-shaped solar battery is spread. Further, the sheet-shaped solar battery is spread on the back side of the electric vehicle so as to come into contact with a road surface. Further, the power source includes a storage battery, and the storage battery is adapted to be charged by the sheet-shaped solar battery in its spread condition.

In accordance with another aspect of the present invention, there is provided equipment for an electric vehicle including a storage battery and an electric motor adapted to be supplied with electric power from the storage battery for vehicle driving, the equipment including a sheet-shaped solar battery for electric power generation; and coupling means for supplying electric power from the sheet-shaped solar battery to at least one of the storage battery and the electric motor. Preferably, the sheet-shaped solar battery is adapted to be rolled for storage in the electric vehicle.

According to the present invention, when the sheet-shaped solar battery is used to perform electric power generation, the sheet-shaped solar battery is taken out of the storing portion and then spread to effect photovoltaic power generation. Accordingly, even when the supply of electric power from the power source becomes impossible, electric power can be simply obtained by spreading the sheet-shaped solar battery taken out of the storing portion, provided that the environment outside the electric vehicle is in a condition where photovoltaic power generation can be effected by the sheet-shaped solar battery. Accordingly, the electric vehicle can be driven by the electric power generated by the sheet-shaped solar battery. In particular, in the case that the sheet-shaped solar battery is stored in a rolled condition in the storing portion, the area of the sheet-shaped solar battery in its operating condition (spread condition) can be set greater than the area of the vehicle as viewed in plan. Accordingly, as compared with the case of mounting a solar panel on the roof or hood of the vehicle body, larger electric power can be obtained.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
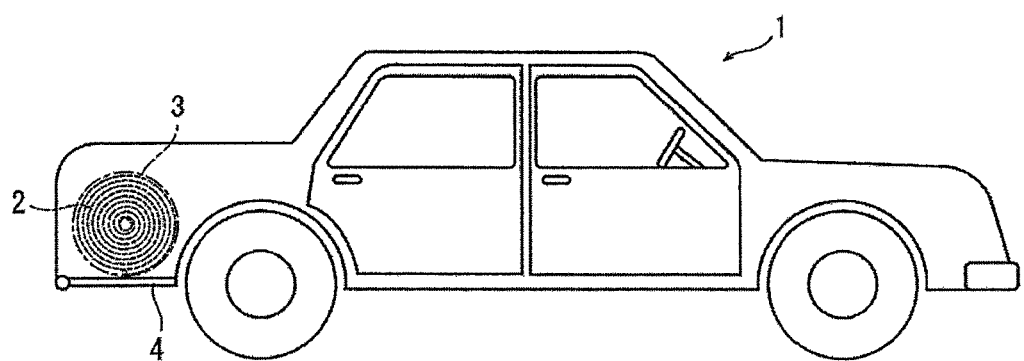
FIG. 1 is a right side view of an electric vehicle according to a preferred embodiment of the present invention.

A preferred embodiment of the electric vehicle and the equipment therefor according to the present invention will now be described in detail with reference to the attached drawings. FIG. 1 is a right side view of an electric vehicle 1 according to this preferred embodiment. As shown in FIG. 1, the electric vehicle 1 includes a storing portion 3 for storing a sheet-shaped solar battery 2. The storing portion 3 is provided at a part of a luggage space defined in a rear portion of the vehicle. For example, the sheet-shaped solar battery 2 includes a flexible base sheet and a photoelectric conversion layer formed on the base sheet, thereby forming a functional sheet. Both sides of the functional sheet are sealed with a transparent resin sheet. As shown in FIG. 1, the sheet-shaped solar battery 2 is stored in the storing portion 3 in the condition where it is rolled compactly. Electric power generated by the sheet-shaped solar battery 2 is drawn from the right or left end of the core of the roll of the sheet-shaped solar battery 2, and then introduced to a connector 6 shown in FIG. 2.

Figure 2:
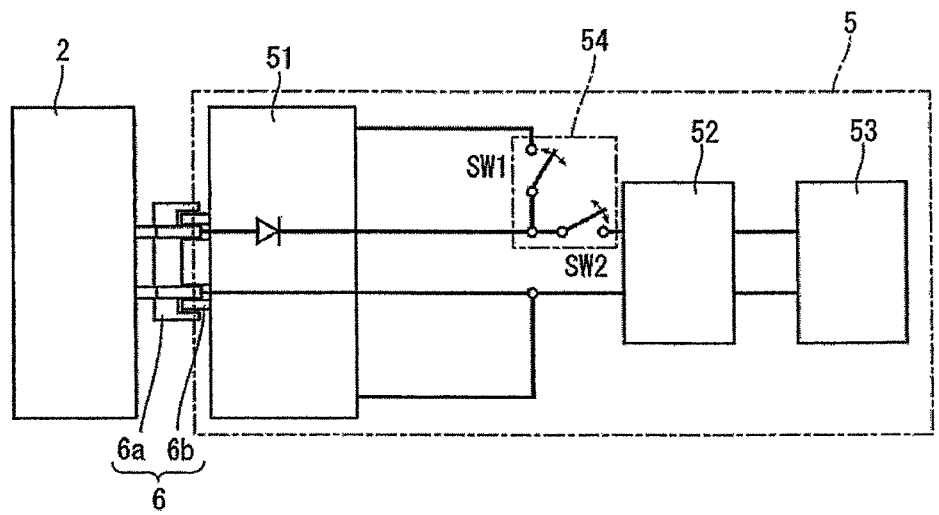
FIG. 2 is a block diagram of a drive system installed in the electric vehicle shown in FIG. 1.

As shown in FIG. 2, the electric vehicle 1 includes an electrical drive system 5. The electrical drive system 5 includes a storage battery 51 as a power source, an electric motor 53 for driving the drive wheels of the vehicle, and control means 52 for controlling the current to be supplied to the electric motor 53. The electrical drive system 5 further includes switches SW1 and SW2 constituting connecting means 54 for providing the connection between the sheet-shaped solar battery 2 and the storage battery 51 or the connection between the sheet-shaped solar battery 2 and the electric motor 53. A diode for preventing reverse current is provided on the circuit connecting the sheet-shaped solar battery 2 and the connecting means 54.

The sheet-shaped solar battery 2 stored in the storing portion 3 is connected through the connector 6 as coupling means to the electrical drive system 5. The connector 6 is composed of a male terminal 6a and a female terminal 6b. By providing the connector 6, the sheet-shaped solar battery 2 is prepared as equipment detachable with respect to the electric vehicle 1. That is, the sheet-shaped solar battery 2 can be disconnected from the electrical drive system 5 as required. The body of the electric vehicle 1 is provided with a charging port (not shown), and the storage battery 51 can be charged from a commercial power supply through the charging port in normal use.

The operation of the electric vehicle 1 configured above will now be described. While the sheet-shaped solar battery 2 is detachably connected through the connector 6 to the electric vehicle 1, the following description will be given provided that the sheet-shaped solar battery 2 is normally stored in the storing portion 3 and electrically connected through the connector 6 to the electrical drive system 5.

In normal use, the roll of the sheet-shaped solar battery 2 is stored in the storing portion 3 of the electric vehicle 1, and power generation is not performed by the sheet-shaped solar battery 2 in this rolled condition. Further, the switches SW1 and SW2 shown in FIG. 2 are both turned on to make a condition that electric power is supplied from the storage battery 51 through the control means 52 to the electric motor 53. A driver in this electric vehicle 1 can check a meter indicating a storage capacity at a driver's seat. When the driver recognizes that the storage capacity has been reduced, the storage battery 51 can be charged through the charging port provided on the vehicle body at home having any charging equipment or at an external charging station. However, in general, a storage battery provided in an electric vehicle requires several hours or more until a full-charged state is reached, even by using a quick charging system. Accordingly, it is assumed that the storage battery cannot be easily charged during driving the electric vehicle. In the case that a charging station is absent nearby in driving the electric vehicle, it is difficult to charge the storage battery with good timing.

Figure 3:
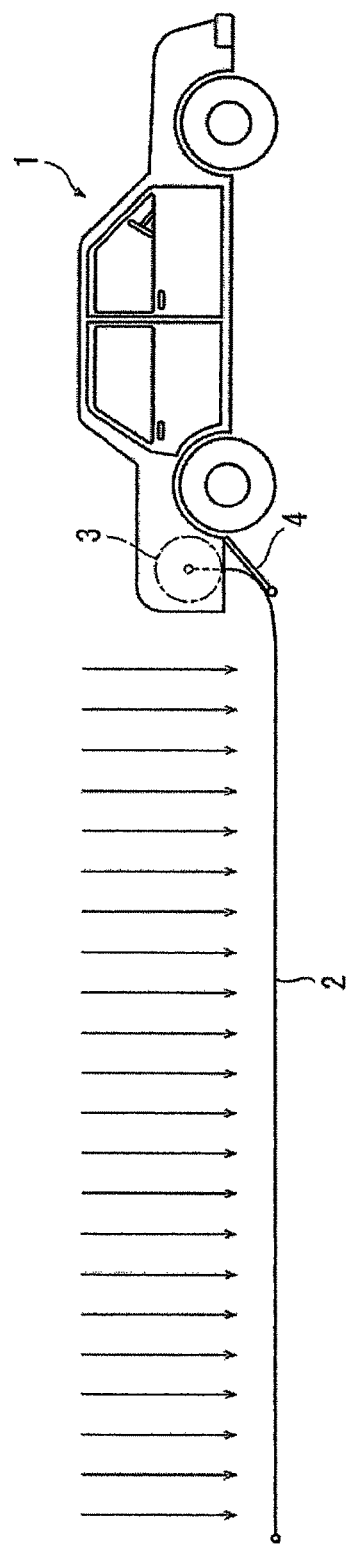
FIG. 3 is a side view for illustrating a condition that a sheet-shaped solar battery included in the electric vehicle shown in FIG. 1 is spread to effect photovoltaic power generation.

To cope with this problem, the following configuration has been made by the present invention. It is assumed that the electric vehicle 1 is driven under the sun in an area apart from an urban area where relatively many charging systems are installed, such as in a suburb where no charging station or equipment is present or on a deserted plain, and that the good timing of charging the storage battery is lost to result in a reduction in storage capacity down to a lower limit. In this case, the driver stops driving the electric vehicle 1 and then take the sheet-shaped solar battery 2 out of the storing portion 3. More specifically, as shown in FIG. 3, an opening portion 4 is provided on the lower surface of the rear portion of the vehicle where the storing portion 3 is located. The storing portion 3 is provided at a part of the luggage space in the rear portion of the vehicle. The roll of the sheet-shaped solar battery 2 stored in the storing portion 3 is unwound to be drawn out of the storing portion 3 through the opening portion 4 and then spread on the back side of the vehicle as shown in FIG. 3.

The sheet-shaped solar battery 2 is formed from a flexible resin sheet, which is thin and light in weight. Accordingly, as compared with the case of mounting a solar panel on the roof or hood of the vehicle body, much larger area can be ensured, so that sufficient solar irradiation can be obtained to result in large amount of power generation.

After spreading the sheet-shaped solar battery 2, the switches SW1 and SW2 may be set according to the circumstances to thereby change the connected condition among the sheet-shaped solar battery 2, the storage battery 51, and the electric motor 53. For example, in the case that strong solar irradiation is obtained to ensure a sufficient amount of power generation and that higher priority is given to the movement of the vehicle from the present rest position, the switch SW1 is turned off and the switch SW2 is turned on. In this case, all the electric power from the sheet-shaped solar battery 2 can be supplied through the control means 52 to the electric motor 53 in the condition where the sheet-shaped solar battery 2 is kept spread. That is, the electric vehicle 1 can be driven by only the electric power from the sheet-shaped solar battery 2.

In the case that the solar irradiation is not enough and the electric power of the sheet-shaped solar battery 2 is insufficient for the movement of the electric vehicle 1, the switch SW1 is turned on and the switch SW2 is turned off. In this case, the storage battery 51 is charged by the electric power of the sheet-shaped solar battery 2 in the condition where the rest condition of the electric vehicle 1 is maintained. That is, all the electric power from the sheet-shaped solar battery 2 is supplied to the storage battery 51. Even when the electric power to be supplied from the sheet-shaped solar battery 2 to the electric motor 53 is insufficient for the movement of the electric vehicle 1, the storage capacity of the storage battery 51 can be increased to allow the movement of the electric vehicle 1 by supplying the electric power from the sheet-shaped solar battery 2 to the storage battery 51 for some long period of time. Accordingly, the switches SW1 and SW2 are preferably set as mentioned above to charge the storage battery 51 by supplying the electric power of the sheet-shaped solar battery 2.

In the case that the amount of power generation by the sheet-shaped solar battery 2 is more sufficient, both the switches SW1 and SW2 may be turned on. In this case, the electric power generated by the sheet-shaped solar battery 2 can be supplied to both the electric motor 53 and the storage battery 51. Accordingly, the electric vehicle 1 can be driven by the electric power from the sheet-shaped solar battery 2 and at the same time the storage battery 51 can be charged.

According to the present invention as described above, even in the case that the storage capacity is reduced or reaches a lower limit during running in an area where no charging equipment is present, the sheet-shaped solar battery 2 stored compactly in the storing portion 3 of the electric vehicle 1 in normal use can be largely spread to be used for power generation. Accordingly, the distance that can be traveled by the electric vehicle 1 can be increased. Further, the sheet-shaped solar battery 2 is prepared as the equipment detachably connected through the connector 6 as coupling means to the electric vehicle 1. Accordingly, the sheet-shaped solar battery 2 can be removed from the electric vehicle 1 as required, and the storing portion 3 can be used as a luggage space.

While the connecting means 54 for switching the connected condition among the sheet-shaped solar battery 2, the storage battery 51, and the electric motor 53 simply includes the switches SW1 and SW2 in this preferred embodiment, a modification may be made in the following manner. For example, the connecting means 54 may be incorporated in the control means 52, wherein the connecting means 52 may be connected through a generally known overcharge preventing circuit to the sheet-shaped solar battery 2. Accordingly, even when charging of the storage battery 51 is started in the condition near the full-charged state and the storage capacity of the storage battery 51 has reached 100%, the charging operation can be automatically stopped to thereby protect the storage battery 51.

Further, while the electric vehicle 1 in this preferred embodiment is an electric vehicle not including an internal combustion engine or the like as vehicle driving means, but including only the electric drive system 5, the present invention is not limited to such a configuration. For example, the present invention is applicable also to a hybrid electric vehicle including an internal combustion engine to be used for electric power generation and a fuel cell vehicle including a fuel cell.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An electric vehicle comprising:
a power source;
an electric motor adapted to be supplied with electric power from said power source for vehicle driving;
a sheet-shaped solar battery for electric power generation;
a storing portion for storing said sheet-shaped solar battery in its nonoperating condition; and
connecting means for allowing supply of electric power from said sheet-shaped solar battery to at least one of said electric motor and said power source;
wherein when said sheet-shaped solar battery is used to perform electric power generation, said sheet-shaped solar battery is taken out of said storing portion and then spread to effect photovoltaic power generation,
wherein said sheet-shaped solar battery is spread on a back side of said electric vehicle so as to come into contact with a road surface, and
wherein said sheet-shaped solar battery is stored in a rolled condition in said storing portion.

2. The electric vehicle according to claim 1, wherein a position of said storing portion is set so that said electric vehicle can be driven in a condition where said sheet-shaped solar battery is spread.

3. The electric vehicle according to claim 1, wherein said power source includes a storage battery, and said storage battery is adapted to be charged by said sheet-shaped solar battery in its spread condition.

4. An electric vehicle comprising:
a power source;
an electric motor adapted to be supplied with electric power from said power source for vehicle driving;
a sheet-shaped solar battery for electric power generation;
a storing portion for storing said sheet-shaped solar battery in its nonoperating condition; and
connecting means for allowing supply of electric power from said sheet-shaped solar battery to at least one of said electric motor and said power source;
wherein when said sheet-shaped solar battery is used to perform electric power generation, said sheet-shaped solar battery is taken out of said storing portion and then spread to effect photovoltaic power generation,
wherein said sheet-shaped solar battery is spread on a back side of said electric vehicle so as to come into contact with a road surface.

5. The electric vehicle according to claim 4, wherein said power source includes a storage battery, and said storage battery is adapted to be charged by said sheet-shaped solar battery in its spread condition.

6. Equipment for an electric vehicle including a storage battery and an electric motor adapted to be supplied with electric power from said storage battery for vehicle driving, said equipment comprising:
a sheet-shaped solar battery for electric power generation; and
coupling means for supplying electric power from said sheet-shaped solar battery to at least one of said storage battery and said electric motor, wherein said sheet-shaped solar battery is adapted to be rolled for storage in said electric vehicle, and wherein said sheet-shaped solar battery is spread on a back side of said electric vehicle so as to come into contact with a road surface.

* * * * *